(No Model.) 2 Sheets—Sheet 1.
W. S. JOHNSON.
STOCK CAR.
No. 534,333. Patented Feb. 19, 1895.
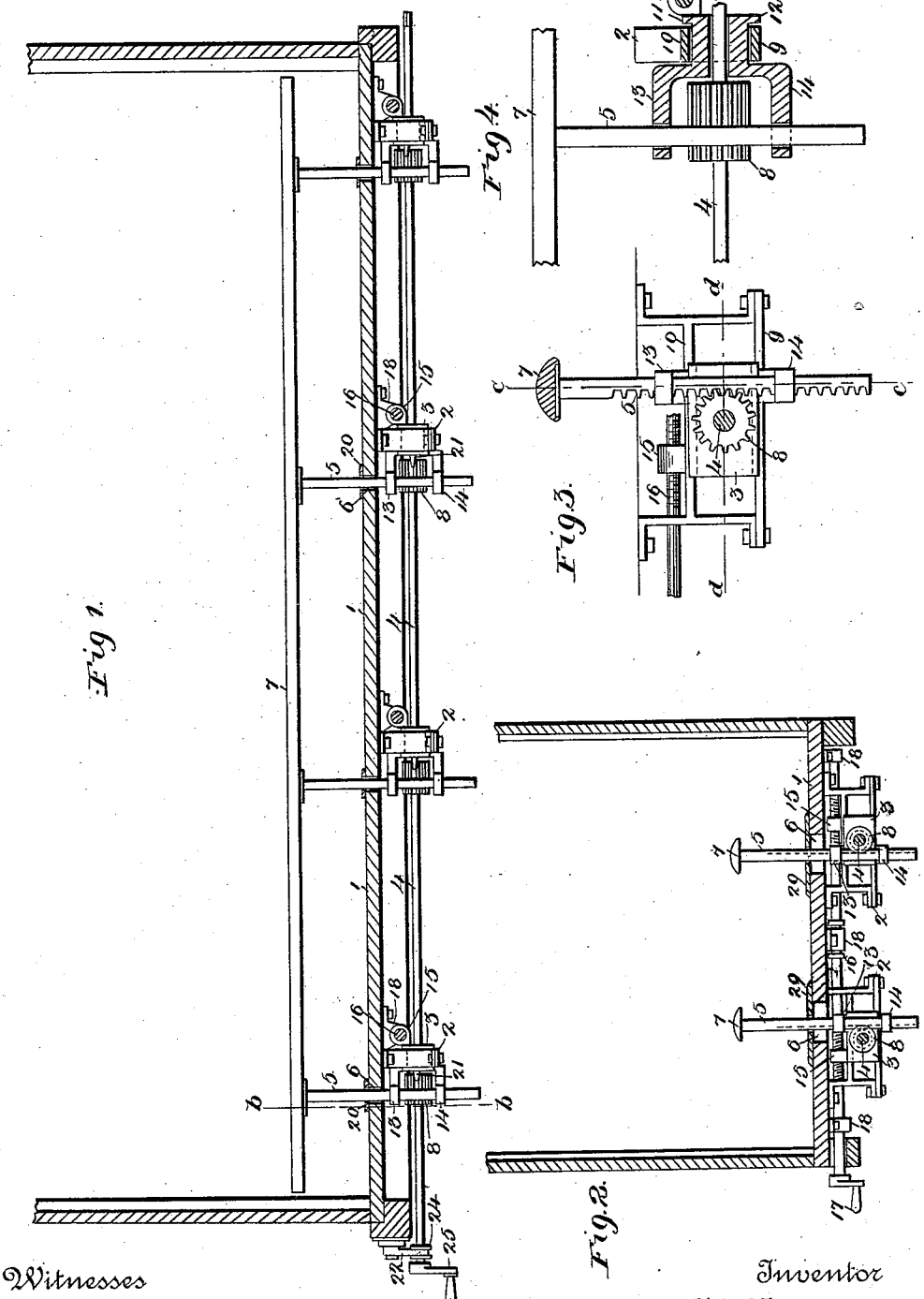
Witnesses
Lee Sale
Bert Paradis
Inventor
W. S. Johnson.
By his Attorneys,
Keller & Starek (No Model.) 2 Sheets—Sheet 2.
W. S. JOHNSON.
STOCK CAR.
No. 534,333. Patented Feb. 19, 1895.
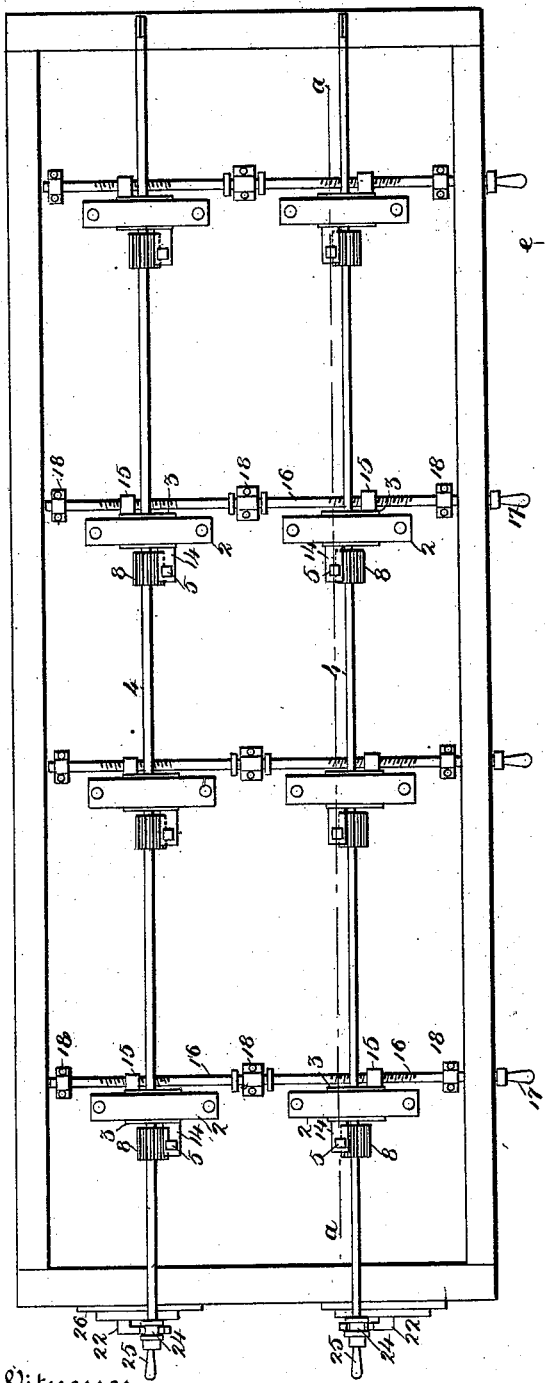

UNITED STATES PATENT OFFICE.

WASH S. JOHNSON, OF ST. LOUIS, MISSOURI.

STOCK-CAR.

SPECIFICATION forming part of Letters Patent No. 534,333, dated February 19, 1895.

Application filed November 30, 1894. Serial No. 530,299. (No model.)

*To all whom it may concern:*

Be it known that I, WASH S. JOHNSON, a citizen of the United States, residing at St. Louis, State of Missouri, have invented certain new and useful Improvements in Stock-Cars, of which the following is a full, clear, and exact description, reference being had to the accompanying drawings, forming a part hereof.

My invention has relation to improvements in stock cars and consists in the novel arrangement and combination of parts more fully set forth in the specification and pointed out in the claims.

In the drawings, Figure 1 is a vertical longitudinal section of a cattle car taken on the line $a$—$a$ of Fig. 5. Fig. 2 is a vertical section on the line $b$—$b$ of Fig. 1. Fig. 3 is a detail end view of one of the supporting boxes secured to the bottom or under side of the floor which carries the movable bearing for the operating shaft and the rack bars to be hereinafter more fully described. Fig. 4 is a section on line $c$—$c$ of Fig. 3. Fig. 5 is a plan view of the bottom or under side of the car-floor. Fig. 6 is a section on the line $d$—$d$ of Fig. 3. Fig. 7 is an end view of the lower side of the car; and Fig. 8 is a section on line $e$—$e$ of Fig. 7.

The object of my invention is to construct a stock car which shall admit of the ready entrance thereinto of stock or cattle to be shipped, and when the animals are once in place and properly adjusted to provide means forming a part of or in connection with the floor frame, that may be operated by an attendant for purposes of affording temporary support for the animals while in transit, thus preventing the animals from lying down and being trampled upon by the rest of the herd confined within the car.

In general, the invention consists of one or more bars running preferably longitudinally with the car, and normally resting on the floor of the car so that the animals can pass over the same; of means for bodily elevating said bars to the height of the breast of the animal; of means for laterally adjusting said bars with reference to the side of the car, and of other details of construction to be now described.

Referring to the drawings, 1 represents the floor of a stock car to the under side of which are secured and distributed a series of boxes or castings 2, in alignment with one another and distributed on either side of a central line of the bottom. These boxes act as supports and guides for the movable laterally adjustable bearings 3 which support the longitudinal shafts 4 running parallel with the length of the car. The said bearings act as guides for the vertically operated rack bars 5 which pass through suitable laterally elongated openings 6 in the floor of the car, and whose upper ends jointly carry the longitudinal supporting bars 7, adapted when in their normal position, and when the rack bars are in their lowest position, to rest on the floor of the car and allow the cattle to step over them. The shafts 4 have disposed throughout their length a series of elongated pinions 8 each pinion meshing with its adjacent rack bar, so that when the shaft is turned in the proper direction the pinions engaging with the rack bars will elevate or lower the same at the will of the operator.

In order to accommodate the supporting bars 7 to the various sizes of animals that may be shipped, it is essential that said bars be susceptible of a bodily lateral movement or adjustment, that is to say, that their distance from the sides of the car shall be made variable, this arrangement enabling the operator to cause the bar to support the animal straddling it at a point most convenient for the animal thus supported, and compelled to stand during the long journey.

The lateral adjustment is accomplished as follows: Referring particularly to Figs. 2, 3, and 4, the movable bearing 3 is adapted to slide laterally between the plates 9 and 10 forming part of the box 2, the bearing 3 being held and guided between said plates by the flanges 11 and 12, and the arms 13 and 14 through suitable openings of which the rack bars 5 pass. To each bearing 3 is secured or cast thereto an interiorly screw-threaded lug 15, and through each opposite pair of lugs as best seen in Figs. 2 and 5, is passed a transverse rod 16 having right and left hand screw threaded portions co-operating with said lugs, the said rod having at one end a suitable operating handle 17 by which it can be turned, the said rods being mounted in suitable bearings 18 disposed along the bottom or under side of the floor of the car. It is apparent that as the rods 16 are turned one way or the other, the bearings 3 supporting the longitudinal shafts 4 will be adjusted laterally to or from each other as the case may be. In this lateral adjustment of course the rack bars are carried along and move laterally, being permitted to do so by the laterally elongated openings 6 in the floor of the car through which said rack bars pass. To insure however that these openings always remain covered whatever may be the position of the rack bars, suitable covering plates 20 of sufficient length to overlap the openings are passed over the rack bars and are thus reciprocated with them, always however covering or overlapping the openings in the floor and thus preventing the feet of the animal from entering the same.

When the supporting bars 7 are elevated sufficiently to form a support for the animals straddling them, it is essential of course that the weight of the animal shall not depress the entire series of rack bars forming the support for the said longitudinal bars 7. This I accomplish by forcing the entire series of pinions 8 into engagement with a corresponding series of engaging fingers 21 forming a part of the movable bearings 3, it being understood that the longitudinal shafts 4 are susceptible of a bodily longitudinal movement in their bearings to effect the engagement of their pinions 8 with said supporting fingers 21. To lower the series of rack bars and the supporting bars 7 carried by them, at the end of the journey or when it is desirable to allow the animals to leave the car, the pinions 8 are disengaged from their supporting fingers, and by turning the longitudinal shafts 4 in proper direction the entire series are let down and the animals are thus allowed to pass out of the car. To prevent accidental disengagement of the pinions 8 with their supporting fingers while the car is in transit, I provide a suitable latch 22 pivoted at the end of the car, whose forked or engaging end 23 engages a collar 24 at the outer end of the shaft 4 adjacent to its operating handle 25. In this manner the jolting of the car prevents accidental shifting of the shafts 4 and the pinions carried by them. As the shaft 4 is laterally adjustable it is essential of course that the pivotal point of the latch 22 shall also be laterally adjustable, and for this purpose I provide a guide plate 26 having a slot 27 along which the pivotal point of the latch can be shifted to accommodate the various positions of the shaft 4.

As seen in the drawings, the edges of the supporting bars 7 are rounded so that the animal can in no way become injured or scratched.

It is apparent that the supporting bars 7 when elevated may form a support for a temporary flooring placed over them thus dividing the car into two compartments.

Having described my invention, what I claim is—

1. In a stock car, a suitable floor, bars normally resting on said floor, means for varying the relative distance between said bars and suitable devices for elevating said bars above the floor and thus form supports for the animals in the car, substantially as set forth.

2. In a stock car, one or more bars running lengthwise with and normally resting on the floor of the car, suitable mechanism for shifting said bars laterally suitable rack bars secured to the under surface of the same and passing through suitable openings in the floor of the car, a shaft secured to the floor frame, pinions carried by the shaft and meshing with the rack bars, and suitable means for operating the shaft, substantially as set forth.

3. In a stock car, one or more bars adapted to normally rest on the floor of the car and running longitudinally therewith, supporting rack bars secured to said bars and passing through suitable elongated openings in the floor of the car, longitudinal shafts secured to the bottom of the floor frame, pinions on said shafts adapted to mesh with the rack bars for elevating or lowering the same and the supporting bars carried by them, laterally adjustable bearings for said shafts, and suitable means for turning said shafts, substantially as set forth.

4. In a stock car, a series of supporting boxes secured to the floor frame, an upper and lower guide plate forming a part of each box, a bearing laterally movable between said plates, a shaft passing through the series of bearings and adapted to move longitudinally therein, a series of transverse rods mounted in the floor frame co-operating with the movable bearings and adapted to shift the same laterally, guide arms carried by the bearings, a suitable rack bar passing through said arms and through the floor of the car, pinions mounted on the shaft engaging with the rack bars, and means for operating the shaft, substantially as set forth.

5. In a stock car, a series of bearings mounted on the under side of the floor frame, a shaft passing through the bearings and susceptible of longitudinal movement therein, pinions on the shaft adjacent to the bearings, a supporting finger carried by each bearing adapted to be alternately engaged with or disengaged from each pinion, a series of rack bars meshing with the pinions on the shaft and passing through the floor of the car, means for shifting the bearings laterally, and a pivoted latch adapted to engage with the shaft and temporarily prevent the longitudinal shifting of the same, the pivotal point of said latch being adapted to be shifted according to the adjustment given to the shaft-supporting bearings, substantially as set forth.

6. In a stock car, one or more longitudinally movable and laterally adjustable shafts, rack bars adapted to be operated by said shafts, suitable supporting bars carried by the upper ends of said rack bars a plate secured to the end of the car, a slot in said plate, and a latch pivoted within the slot and susceptible of lateral adjustment along said slot, the free end of the latch being adapted to engage with the shaft, substantially as set forth.

7. In a stock car, a series of movable bearings in transverse alignment secured to the floor of the car, an interiorly screw-threaded lug carried by each bearing, a transverse rod having right and left handed exterior screw-threaded portions co-operating with the lugs, suitable means for turning the rod and thus varying the relative distance between the bearings, and suitable rack bars in operative connection with the movable bearings substantially as set forth.

8. In a stock car, a series of supporting bars running longitudinally with the car, supporting rack bars for the same passing through laterally elongated openings in the floor of the car, means for laterally shifting said bars, an elongated plate passed over each rack bar and adapted to cover the opening in the floor at all positions of the rack bars, substantially as set forth.

In testimony whereof I affix my signature in presence of two witnesses.

WASH S. JOHNSON.

Witnesses:
LEE SALE,
E. STAREK.